May 4, 1926.
J. J. MASCUCH
1,583,064
AUTOMOBILE BUMPER AND BRACKET
Filed June 15, 1925
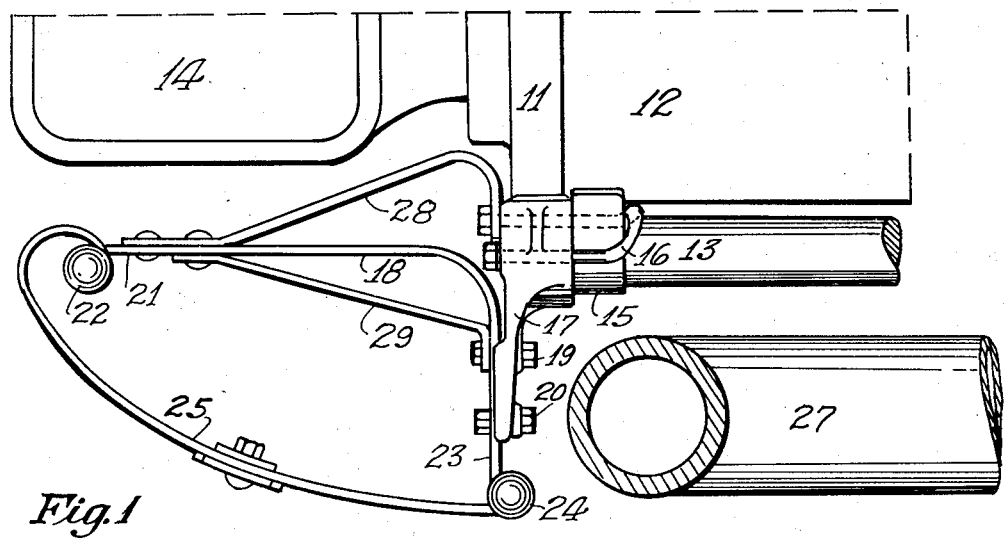
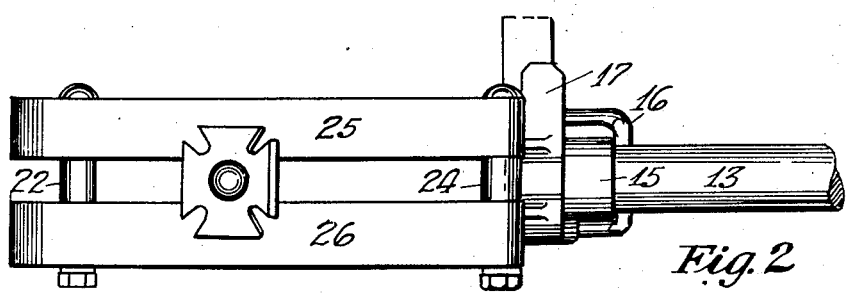
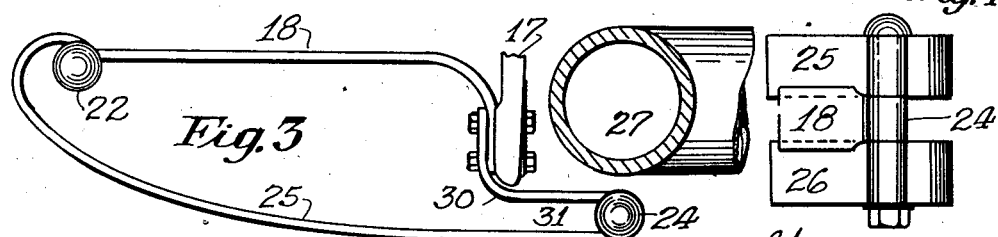
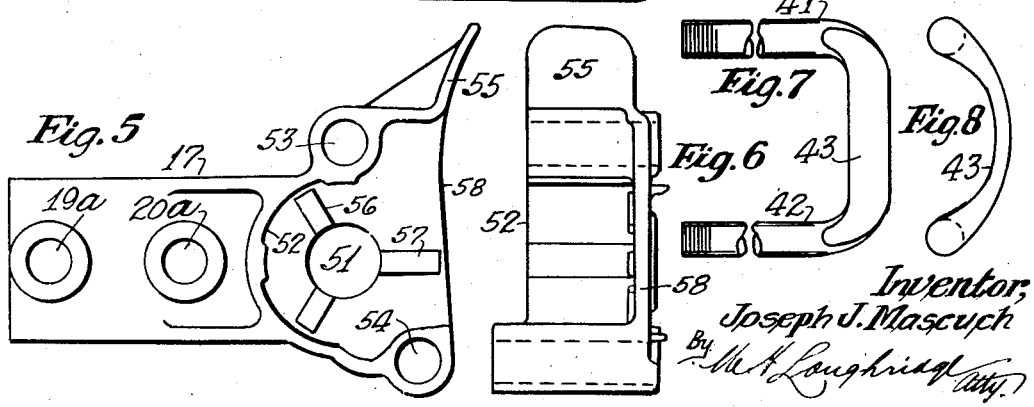
Inventor,
Joseph J. Mascuch Patented May 4, 1926.

1,583,064

UNITED STATES PATENT OFFICE.

JOSEPH J. MASCUCH, OF EAST ORANGE, NEW JERSEY.

AUTOMOBILE BUMPER AND BRACKET.

Application filed June 15, 1925. Serial No. 37,398.

*To all whom it may concern:*

Be it known that I, JOSEPH J. MASCUCH, a citizen of the United States, and a resident of East Orange, Essex County, New Jersey, have invented certain new and useful Improvements in Automobile Bumpers and Brackets, of which the following is a specification.

This invention relates to automobile bumpers and it relates particularly to a type of bumper adapted for the rear of vehicles which also carry a spare tire on the rear. An object of the invention is to provide a bumper of this class made from flat spring stock which is resilient, light and capable of resisting considerable impact, another object of the invention being to provide a reinforced support for the impact members of the bumper and a further object of the invention resides in the method of attachment to the vehicle. Other objects and advantages will appear as the description of the particular physical embodiment selected to illustrate the invention progresses, and the novel features of the invention will be particularly pointed out in the appended claims. In the drawings illustrating my invention, Fig. 1 is a plan view of one side of the rear of a vehicle with the bumper in place, Fig. 2 is an elevation of the construction shown in Fig. 1, Fig. 3 is a plan view of a modified type of bumper, Fig. 4 is a detail of the end connections, Fig. 5 is a side view and Fig. 6 is an end view of the attaching bracket and Figs. 7 and 8 show the form of U bolt used for attaching the bracket to the vehicle frame.

Bumpers applied on the rear of an automobile are placed at the sides to protect the fenders and the centre of the vehicle is reserved for spare tires which, of themselves, form a bumper in cases of emergency. In the present invention a bracket is provided with a pocket which fits over the spring knuckle of the frame and is clamped in place by a special U bolt to project longitudinally in rear of the vehicle. To this bracket rear supporting members are bolted and pivotally connected with the ends of these members is the impact member of the bumper. In the modified form the impact member extends beyond the bracket towards the centre of the vehicle, thus increasing the area protected and shielding the spare tire.

Referring to the drawings, 11 is the side member of the vehicle frame which terminates in the spring knuckle, 12 is a tank or body of the car, 13 is a rear connecting bar between the side frame members of the automobile, 14 is the fender, 16 is the U bolt which clamps the bracket 17 in place, 18 is a rear supporting member which at the end 21 connects to the end post 22 and at the end 23 connects to the end post 24. This rear supporting member is secured to the bracket 17 by the bolts 19 and 20. The impact member comprises a pair of parallel bars 25 and 26 secured in vertical relation by the end posts 22 and 24 and are curved as shown around the rear corner of the vehicle. The spare tire 27 occupies the horizontal plane between a pair of bumper members such as shown in Fig. 1. The rear supporting member 18 may be reinforced by the truss construction formed by bars 28 and 29 as shown which support the end 21 at its weakest point.

In the construction shown in Fig. 3 the impact bars extend to partially enclose the tire 27. For this purpose the L shaped member 30 is provided secured to bracket 17. This provides a resilient support for the end 24 of the impact member until the gap 31 is closed by deflecting the impact member.

The connection of the impact member and the rear supporting member through the end post is shown from the front in Fig. 4. Eyes are formed in each of the bars which are held in vertical relation by the bolt of the end post.

The bracket 17, Fig. 5 is provided with holes 19ª and 20ª for the bolts 19 and 20. The end is formed in a pocket about the centre 51 which receives the bolt of the knuckle and has the upstanding ledge 52 which encloses the knuckle, with the wing 55 engaging the side frame 11. Holes 53 and 54 are provided for the U bolt. When in place the rib 58 is secured against the side frame bearing upon the pads 56 and 57.

The bracket is secured to the side frame by a U bolt, but there is not sufficient space between the bar 13 and the tank 12 for a U bolt of ordinary width. Further, the bar 13 and the collar 15 traverse the space between the holes 53 and 54 of the bracket. This requires that the U bolt be formed as shown in Figs. 7 and 8. The legs 41 and 42 are connected by the arched member 43 which is flattened as shown to pass between 12 and 13 and the arch formation clears the round bar 13 and bears against the collar 15 as shown in Fig. 1.

It will be observed that the entire bumper is removed by releasing the U bolt.

Having thus described my invention, I claim:

1. In an automobile bumper of the class described, the combination of a bracket secured to the vehicle frame, an arm bent at right angles supported by said bracket, an impact member comprising a pair of parallel bars held in vertical relation by end posts, said arm connecting at each end to said end posts and spaced members secured to said bracket for reinforcing said arm.

2. In an automobile bumper of the class described, the combination of a bracket secured to the vehicle frame, an arm bent at right angles and formed in an eye at each end supported by said bracket, an impact member comprising a pair of parallel bars held in vertical relation by end posts, said arm engaging said end posts for supporting said impact member and reinforcing members secured to said bracket placed on either side of said arm.

3. In an automobile bumper of the class described, the combination of a bracket, a U bolt for clamping said bracket to the automobile frame, a bar on the automobile parallel with said bolt, said U bolt arched at its inner end to engage said bar and an impact member supported by said bracket.

4. In an automobile bumper of the class described, the combination of a bracket, a U bolt clamping said bracket to the automobile frame, a bar on the automobile traversing the plane between the legs of said U bolt, said U bolt being deflected to clear said bar and an impact member supported by said bracket.

5. In an automobile bumper, the combination of a bracket secured to the side of the automobile frame and projecting substantially in line with said frame, an arm supported by said bracket and extending horizontally on either side of said bracket and an impact member secured by its ends to the ends of said arm.

6. In an automobile bumper for the rear of vehicles, the combination of a bracket secured to the side of the vehicle, an arm secured to said bracket, said arm projecting horizontally for a limited distance towards the centre of the vehicle and an impact member secured by its end to said arm.

7. In an automobile bumper for the rear of vehicles, the combination of a bracket secured to the side of the vehicle, an arm secured to said bracket, said arm bent rearwards at right angles towards the centre of the vehicle and an impact member parallel with and pivotally secured to said arm.

Signed at New York, in the county of New York, this 28th day of May, 1925.

JOSEPH J. MASCUCH.